United States Patent [19]

Wentz

[11] Patent Number: 5,567,127
[45] Date of Patent: Oct. 22, 1996

[54] LOW NOISE AIR BLOWER

[76] Inventor: Kenneth W. Wentz, 2604 Tracee Way, Springdale, Ark. 72764

[21] Appl. No.: 337,953

[22] Filed: Nov. 9, 1994

[51] Int. Cl.$^6$ .................................................. F04B 39/12
[52] U.S. Cl. ................ 417/312; 417/423.9; 417/423.14; 415/119
[58] Field of Search .............................. 417/312, 423.2, 417/423.14, 423.9, 366; 181/201, 202, 204, 205; 415/119

[56] References Cited

U.S. PATENT DOCUMENTS

| | | | |
|---|---|---|---|
| D. 176,190 | 11/1955 | Jacuzzi et al. | D83/1 |
| D. 299,062 | 12/1988 | Young et al. | D24/38 |
| D. 310,877 | 9/1990 | Reeves et al. | D24/38 |
| 1,380,473 | 6/1921 | Guarniery | 181/702 |
| 1,418,238 | 5/1922 | Cramer | 415/119 |
| 1,476,776 | 12/1923 | Stamm et al. | 415/119 |
| 2,661,146 | 12/1953 | Hill et al. | 417/423.1 |
| 2,663,178 | 12/1953 | Schwartz | 68/183 |
| 2,961,149 | 11/1960 | Hull | 417/312 |
| 3,065,746 | 11/1962 | Gregory | 128/66 |
| 3,267,936 | 8/1966 | Brady | 128/66 |
| 3,367,325 | 2/1968 | O'Keefe | 128/66 |
| 3,373,740 | 3/1968 | Riepl | 128/66 |
| 3,417,747 | 12/1968 | Beger | 128/66 |
| 3,556,089 | 1/1971 | Frazier et al. | 128/66 |
| 3,683,899 | 8/1972 | LaBarber | 601/168 |
| 3,710,786 | 1/1973 | Rico et al. | 128/66 |
| 3,750,656 | 8/1973 | Vaughan | 128/66 |
| 3,750,657 | 8/1973 | Lyon | 128/66 |
| 3,809,073 | 5/1974 | Baumann | 128/66 |
| 4,040,415 | 8/1977 | Kulisch | 128/66 |
| 4,218,784 | 8/1980 | Richards | 4/543 |
| 4,245,625 | 1/1981 | Murray | 128/66 |
| 4,280,245 | 7/1981 | Hiester | 417/312 |
| 4,412,791 | 11/1983 | Lal | 417/366 |
| 4,435,877 | 3/1984 | Berfield | 417/312 |
| 4,512,713 | 4/1985 | Berfield | 415/119 |
| 4,856,968 | 8/1989 | Armbuster | 417/360 |
| 4,938,309 | 7/1990 | Emdy | 417/312 |
| 5,279,515 | 1/1994 | Moore et al. | 415/119 |
| 5,293,664 | 3/1994 | Lim et al. | 15/326 |
| 5,296,769 | 3/1994 | Havens et al. | 310/90 |
| 5,336,046 | 8/1994 | Hasmimoto et al. | 417/312 |
| 5,407,330 | 4/1995 | Rimington et al. | 417/312 |
| 5,454,690 | 10/1995 | Wolfe et al. | 417/423.2 |

OTHER PUBLICATIONS

Ametek "Operating and Installation Instructions": Lamb Thru–Flow Vacuum Motor W–VT570–001–D, Lamb Electric Division, 627 Lake St., Kent OH 44240, Apr. 1989.
Ametek, Lamb Electric Division, Technical Bulletin, issued Aug. 1992, Model No. 116882–50.
Wentzcraft, Inc., "Heavenly"Whirlpool Warm Air Spa, Air Filtration System brochure, Jul. 1994.
Modern Plastics Encyclopedia 1989, pp. 118–125.

*Primary Examiner*—Peter Korytnyk
*Attorney, Agent, or Firm*—Daniel R. Alexander; Head, Johnson & Kachigian

[57] ABSTRACT

An air blower including a flow-thru motor and fan unit encapsulated in resilient foam rubber layer within a substantially cylindrical plastic casing is provided which operates very quietly, delivers a sufficient quantity of warm pressurized air and filters the air which flows therethrough. The air blower is eloquently simple in design and relatively inexpensive to manufacture. The air blower incorporates a number of safety features including an outlet structure which prevents the introduction of water into the interior of the blower and a ground fault circuit interrupter. The air which flows through the blower is channeled through the motor to cool the motor and at the same time heat the air flowing through the blower. The resilient foam encapsulation separates the noise and vibration of the motor and fan unit from the casing. The casing includes a plurality of radial air inlets in its base and an air outlet in the side of the casing adjacent its upper end. Consequently, the foam encapsulation above and below the motor and fan unit serve to filter the air passing from the air inlets to the air outlet and reduce the noise which emanates from the outlet and inlets.

28 Claims, 4 Drawing Sheets

LOW NOISE AIR BLOWER

BACKGROUND OF THE INVENTION

The present invention is directed to sources of pressurized air, and more particularly concerns a low-noise air blower for use in or with an air activated water agitator, hydrotherapy system, whirlpool bath, spa, bubble massager and the like and also for use in or as an air filtration system.

Air activated water agitating devices are used in bathtubs, spas, whirlpools and treatment tanks to agitate the fluid in the bathtub or whirlpool to affect a massage or stimulation of that portion of a person's body submerged in the whirlpool or bath. Hydrotherapeutic treatments have been used to treat or provide relief from various back or muscle ailments and as a relaxing benefit to aching bones, joints and muscles.

Air activated bath water bubbling or agitating devices including a source of pressurized air, an elongate flexible hose, and a submersible mat or tubing having a plurality of air jets or openings have been known for many years. U.S. Pat. Nos. 3,367,325, 3,683,899, and 4,245,625 disclose such systems utilizing a conventional household vacuum cleaner as the source of pressurized air for the water agitating device. The use of a conventional vacuum cleaner as a source of pressurized air is less than desirable because vacuum cleaners are not designed for use as the source of pressurized air for a hydrotherapy system, water massager, whirlpool bath, spa or the like. Consequently, vacuum cleaners do not necessarily provide the correct flow or volume of pressurized air, tend to be very noisy and as such are irritating when placed adjacent a whirlpool, bathtub or spa, do not provide sufficiently warm or heated air to prevent the water in the whirlpool, bathtub, spa or the like from being cooled by aeration thereof, and the air exiting the vacuum cleaner may have a disagreeable odor or be dirty due to dirt collected in the vacuum cleaner bag or canister. More importantly, most conventional household vacuum cleaners are not designed for use with water and as such do not have the necessary safety features to protect a user from electrocution or to protect the vacuum cleaner itself from damage due to the inadvertent flow of water into the vacuum cleaner.

It is suggested in U.S. Pat. No. 4,245,625 to use an electric space heater to heat the air adjacent a vacuum cleaner to thereby provide a source of heated pressurized air for use in a bathtub water agitating apparatus. This arrangement is undesirable in that it requires the use of two potentially dangerous electrical devices in a bathroom adjacent a bathtub full of water.

U.S. Pat. Nos. 3,417,747, 3,750,656, 3,809,073, 4,040, 415, add 4,962,759 disclose air activated hydrotherapy or bubble massage apparatus including a blower having an electric motor and a centrifugal fan as a source of pressurized air. Also, U.S. Pat. Nos. 3,417,747 and 4,962,759 disclose the use of electrical heating elements in addition to or in conjunction with the blower.

Attempts have been made to improve air blowers for use with air activated hydrotherapy or whirlpool apparatus to increase user safety by preventing electrical stock caused by the flow of water back into the blower and to prevent damage to the blower itself due to the presence of water. For example, U.S. Pat. Nos. 4,962,759 and 5,067,481 describe blowers which allow for the drainage of water therefrom.

Hence, there exists a need for an improved air blower which not only provides an adequate supply of pressurized warm air but does so in a safe and effective manner with low-noise, sufficient heating of the air and which prevents water from entering the blower. There is also a need for such an improved air blower which is eloquently simple in design and relatively inexpensive to manufacture. Further, there is a need for such an improved air blower which serves not only as a source of pressurized air, but also as an air filtration system.

SUMMARY OF THE INVENTION

In accordance with the present invention, an improved air blower is provided which operates very quietly, provides a sufficient quantity of warm pressurized air and which also serves to filter the air which flows therethrough. The air blower of the present invention is eloquently simple in design and relatively inexpensive to manufacture. Also, it incorporates a number of safety features including an outlet structure which prevents the introduction of water into the interior of the blower, and a ground fault circuit interrupter or breaker in the drive circuit to the blower. The blower of the present invention operates quietly due to features including a circuitous air flow path therethrough, plastic components, a foam encapsulated electric motor and centrifugal fan unit, a constricted pressurized air outlet, an oversized motor and a half-wave rectifier motor drive circuit. Also, the air which flows through the blower is channeled through the motor to cool the motor and at the same time heat the air flowing through the blower.

In accordance with an exemplary embodiment of the present invention, the blower includes a flow-thru motor and fan unit encapsulated in resilient foam rubber within a substantially cylindrical casing. The resilient foam encapsulation separates the noise and vibration of the motor and fan unit from the casing. The casing includes a plurality of radial air inlets in its base and an air outlet in the side of the casing adjacent its upper end. Consequently, the foam encapsulation above and below the motor and fan unit serves to filter the air passing from the air inlets to the air outlet and reduce the noise which emanates from the outlet and inlets.

The blower of the present invention can be used as a low noise air filtration system by placing a replaceable filter element in the air flow path upstream of the motor and fan unit. In accordance with the exemplary embodiment, the plurality of radial inlet openings lead to a central circular opening adapted to receive a replaceable circular filter element which is accessed via a removable, transparent cover plate.

The principal object of the present invention is an improved low-noise warm-air blower which operates safely, effectively and quietly as a source of pressurized air for an air-water massager, whirlpool bath, spa, hydrotherapy unit or the like. Another object of the present invention is the provision of a low-noise air filtration unit.

A still further object of the present invention is the provision of a low-noise warm-air blower including an internal motor and fan separated from an external casing by a resilient foam rubber encapsulation to prevent the conduction of noise or vibration from the motor and fan to the casing.

Still yet another object of the present invention is the provision of a low-noise warm-air blower having a compact and eloquently simple construction.

Another object of the present invention is the provision of a low-noise warm-air blower having a safe pressurized air outlet including a cylindrical outlet cavity having one or more openings in the upper region of the outlet cavity to prevent the inadvertent flow of water to the interior of the blower.

Other objects and further scope of the applicability of the present invention will become apparent from the detailed description to follow taken in conjunction with the accompanying drawings wherein like parts are designated by like reference numerals.

DETAILED DESCRIPTION OF THE PREFERRED EMBODIMENTS

Figure 1:
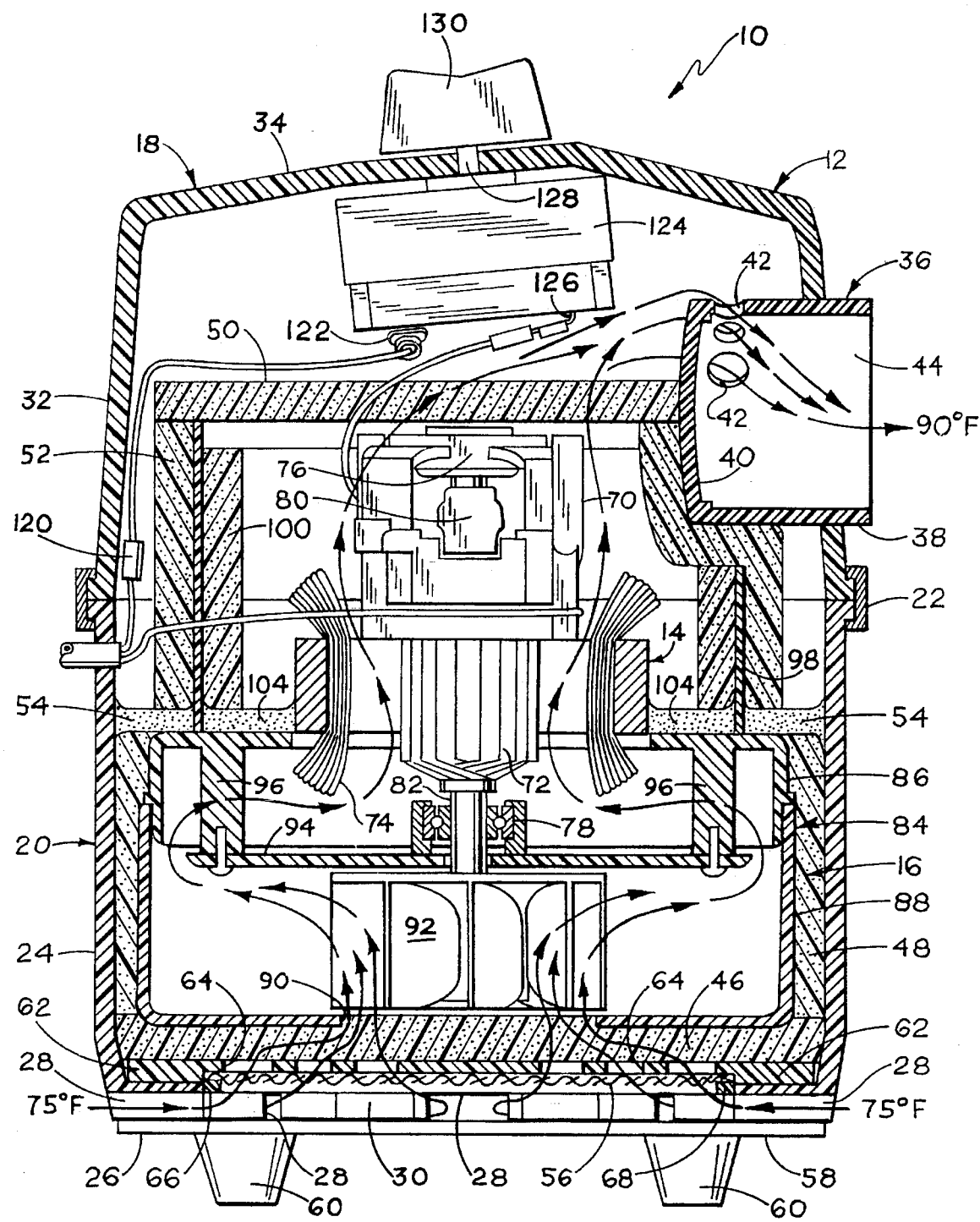
FIG. 1 is a partial vertical cross-section illustration of an exemplary embodiment of the low-noise warm-air blower of the present invention.

In accordance with an exemplary embodiment of the present invention shown in FIGS. 1–4 of the drawings, a low-noise air blower generally designated by the reference numeral 10 includes as major components an outer casing or body 12, a flow-thru motor and fan unit 14, and a resilient foam rubber encapsulation or layer 16 surrounding the motor and fan unit 14 and supporting the motor and fan unit inside of the casing 12 without a rigid connection therebetween. Thus, the resilient foam layer 16 serves to dampen, attenuate and substantially eliminate the transfer or conduction of sound or noise and vibration from the motor and fan unit 14 to the casing 12.

Outer casing 12 includes upper and lower casing sections 18 and 20 held together in an abutting superimposed position by a annular retaining element 22 at or near the midline of the casing 12. Lower casing section 20 includes a substantially cylindrical side wall 24 and an annular base 26 including a plurality of radial openings 28 and a circular central opening 30. The radial openings 28 are the air inlets of the blower 10.

Upper casing section 18 includes a substantially cylindrical side wall 32, a top wall 34, and an outlet structure 36 extending through side wall 32. The outlet structure 36 includes a substantially cylindrical pipe segment 38, a back wall 40, a plurality of small circular openings 42, for example, five openings with a diameter of about one-half of an inch or less, preferably about one-fourth of an inch, located in the upper region of the outlet structure 36, and a large circular opening or outlet 44. The outlet structure 36 extends through a circular opening in the side wall 32 with the small openings 42 located in the interior of a cavity formed by the side wall 32 and top wall 34 and the large opening 44 located outside of the side wall 32. The opening 44 is sized to telescopically receive the end of an elongate flexible supply hose of a bubble massage apparatus such as described in U.S. Pat. No. Des 335,350 issued May 4, 1993.

For example, the circular opening 44 may have a diameter of one and a half to two inches, preferably one and eleven-sixteenths inches.

The foam encapsulation layer 16 separating and supporting the motor and fan unit 14 from and in the outer casing 12 includes upper and lower cup-like foam assemblies. The lower foam assembly has a circular bottom foam piece 46 joined to an upstanding cylindrical side foam piece 48. Similarly, the upper foam assembly includes a circular top foam piece 50 joined to a depending cylindrical side foam piece 52. The interior of the casing 12 is separated into upper and lower air chambers by an annular pliable seal 54 which prevents the flow of air from the top chamber to the bottom chamber through or around the lower side foam piece 48. The seal 54 is made of a resilient tacky material such as a silicone or siliconized gel or sealant which adheres to the foam 48, motor and fan unit 14, and casing side wall 24 while remaining resilient. Hence, there is no rigid connection between the motor and fan unit 14 and the casing 12.

With reference to FIG. 1 of the drawings, the heavy arrows indicate air flow through the blower 10. When the motor and fan unit 14 is activated, air is drawn in through the inlet openings 28 in the base of lower casing section 20, pulled through the lower piece of foam 46, forced through the motor and fan unit 14, and then forced through the upper piece of foam 50, the small circular openings 42, and then out the large circular opening 44. Air is drawn into the blower 10 at room temperature, is heated as it passes through the motor and fan unit 14, and exits the blower 10 at about 10° to 20° F. higher than room temperature. For example, air which enters the blower 10 at about 75° F. exits the blower 10 at about 90° F. Thus, the blower 10 provides warm pressurized air.

Figure 3:
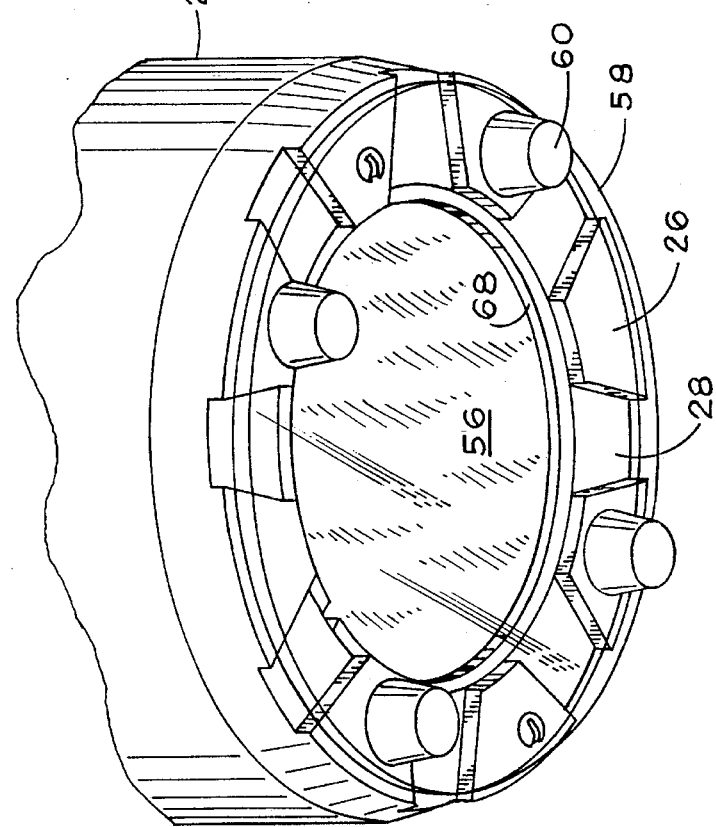
FIG. 3 is a perspective bottom view illustration of the low-noise warm-air blower of FIG. 1.
Figure 4:
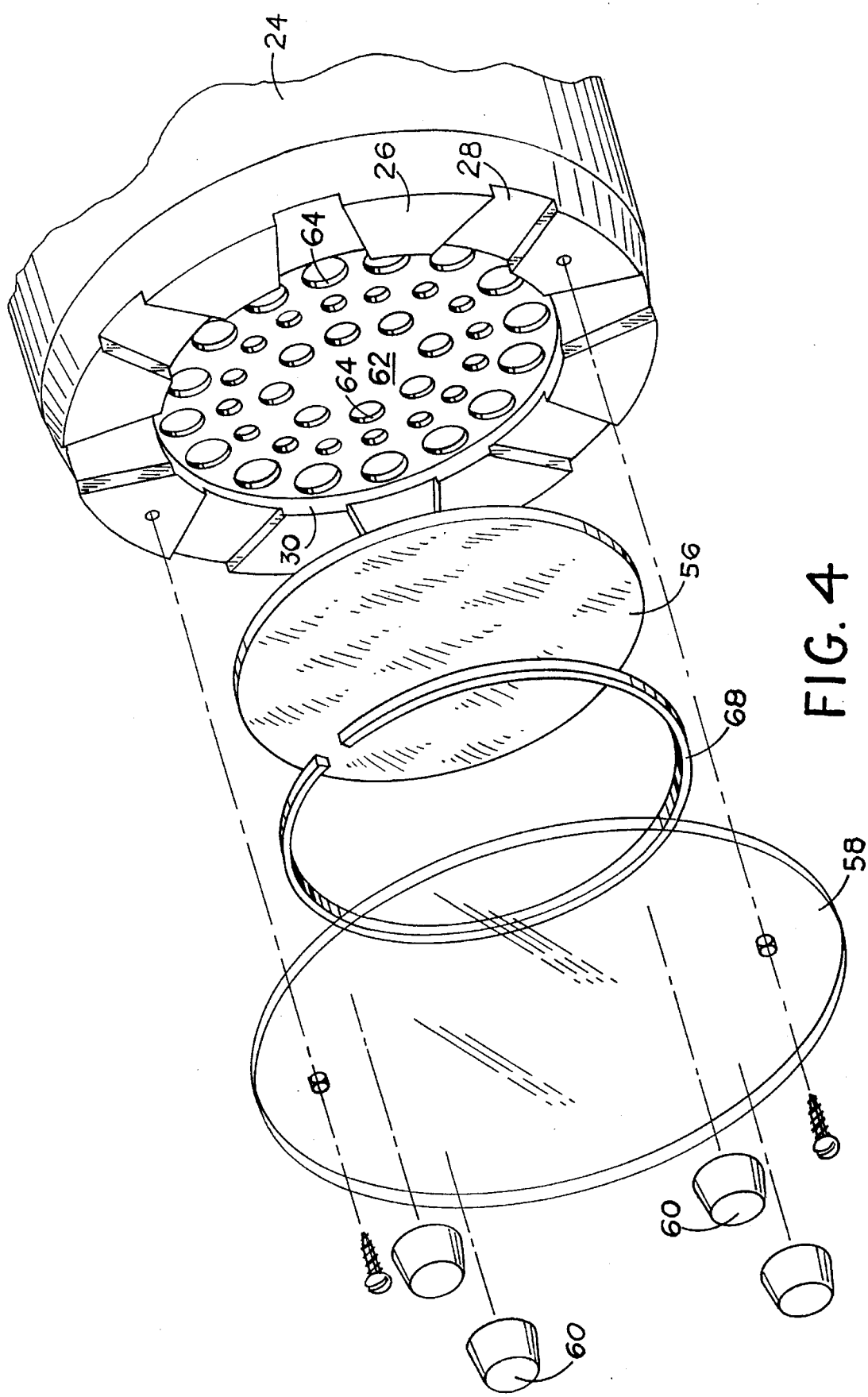
FIG. 4 is an exploded assembly perspective view representation of the lower end of the low-noise warm-air blower of FIG. 3; and, FIG. 5 is a schematic circuit diagram representing the electrical circuit of the low-noise warm-air blower of FIG. 1.

With reference to the exemplary embodiment shown in FIGS. 1, 3 and 4 of the drawings, the low-noise air blower 10 includes a replaceable, circular air filter element 56 upstream of the bottom foam piece 46. The replaceable filter element 56 is accessed through a removable, circular cover plate 58 attached to the bottom surface of the base 26 of lower casing section 20 by, for example, a plurality of threaded fasteners. A plurality of resilient feet or legs 60 are attached to the lower surface of the cover plate 58 by glue, cement or the like. The legs 60 space the air inlets 28 a sufficient distance from the floor to avoid the introduction of water (spilled on the floor) from entering the air inlets 28 and to raise the air inlets 28 a sufficient distance from the floor to avoid having the pile of a plush or shag carpet from blocking the air inlets 28. One-fourth inch to one and one-half inch high resilient rubber or plastic legs 60 are preferred.

In the exemplary embodiment shown in the drawings, the cover plate 58 forms the lower surface of the air inlets 28. The cover plate 58 is preferably made up of a one-eighth inch to one-fourth inch thick, substantially rigid, transparent plastic, acrylic, or plexiglass material which allows the blower user to visually inspect the condition of the filter element 56. For example, the cover plate 58 may be a one-eighth inch thick, six and one-eighth inch diameter disc of transparent plexiglass.

With reference again to FIGS. 1, 3 and 4 of the drawings and the exemplary embodiment of the air inlet and filtration arrangement of the invention, it is preferred that the air inlets 28 be shaped as trapezoids with the openings increasing in dimension toward the central circular opening 30. For example, eight equally spaced openings 28 having an outer dimension of three-fourths of an inch by one-eighth of an inch and inner dimensions of one inch by one-eighth of an inch and a radial length of about one inch. It is preferred that the ratio of total surface area of the inlets 28 to outlets 42 be at least 2:1, more preferably at least 4:1. A support disc 62 including a plurality of spaced, relatively small circular openings 64 is located adjacent the upper surface of base 26 and covers the central opening 30. For example, disc 62 has about forty spaced circular openings 64 each having a diameter of one-fourth to one-half of an inch. Support disc 62 also includes a large circular recess 66 on the lower surface thereof concentric with the opening 30 to accommodate the replaceable circular filter element 56. The replaceable filter element 56 is held in position in the recess 66 by removable retaining ring 68. For example, the support disc 62 includes a plurality of one-fourth to one-half inch diameter openings 64 and a four and one-half inch diameter one-eighth inch deep recess 66 adapted to accommodate a four and one-half inch diameter 3M brand woven filter element 56 having electrostatically charged fibers and held in position by a plastic snap ring 68.

Figure 2:
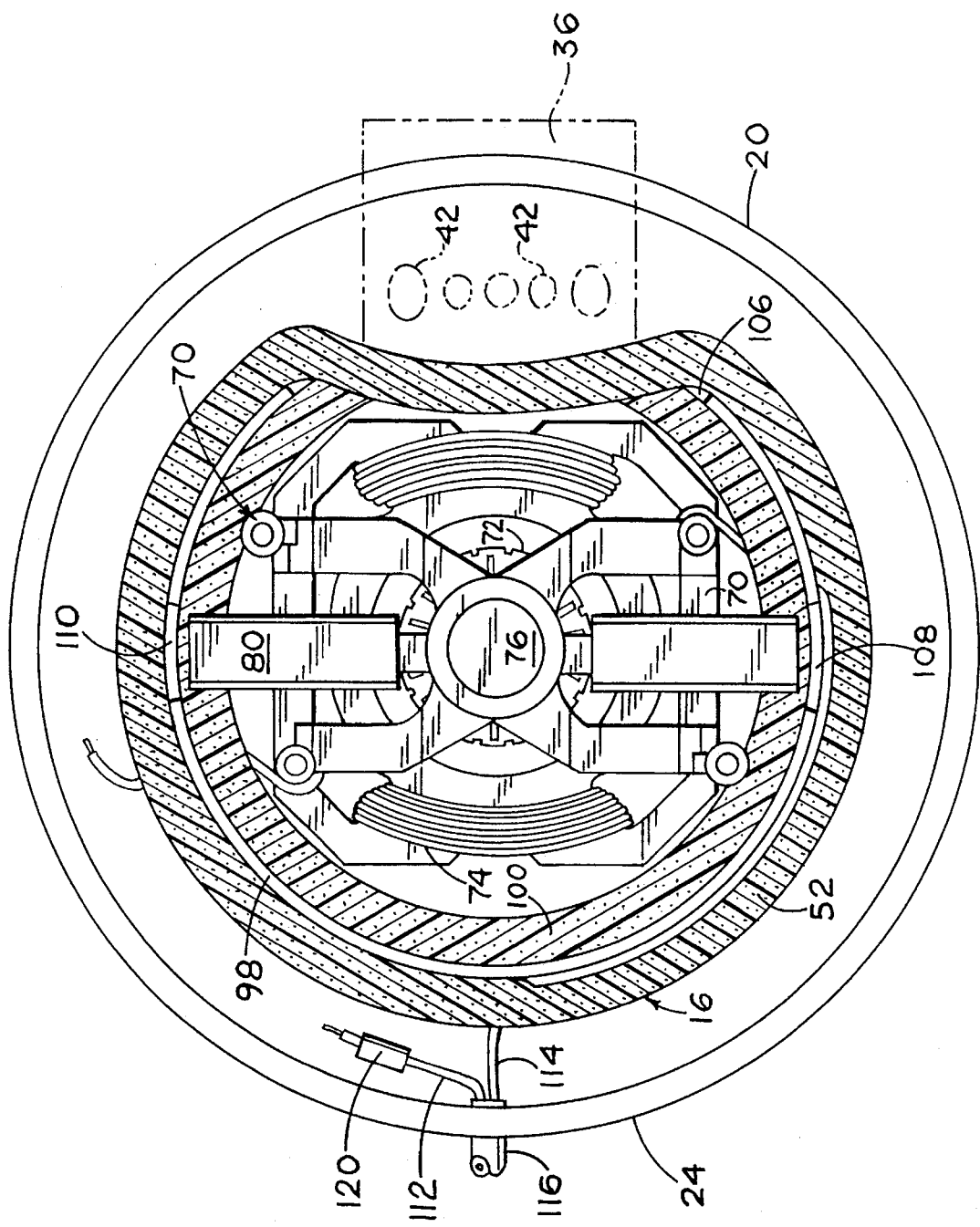
FIG. 2 is a partial horizontal cross-section and top plan view representation of the low-noise warm-air blower of FIG. 1 with the upper casing section and the top portion of the upper foam assembly removed to provide a clear view of the upper end of the electric motor.

With particular reference to FIGS. 1 and 2 of the drawings, the flow-thru motor and fan unit 14 includes a conventional electric motor 70 including an armature or rotor 72, field windings or stator 74, upper and lower bearings 76 and 78, commutator and brushes 80 and a drive shaft 82. The electric motor 70 is a conventional electric motor such as a 120 volt, 60/50 hertz, one phase, ball/sleeve bearing universal electric motor, marketed by AMETEK, Lamb Electric Division, Racine, Wisconsin Wis., 53403 as part of their one stage thru-flow vacuum motor.

The motor and fan unit 14 further includes a substantially cylindrical fan housing 84 having upper and lower housing portions 86 and 88. The lower end of the motor 70 is attached to and supported by the upper fan housing 86. The lower fan housing 88 includes a central circular opening or orifice 90 serving as an air inlet to the motor and fan unit 14. The lower fan housing 88 is sized to accommodate a radial fan blade or impeller 92 attached to the bottom end of the drive shaft 82. A circular air diverter 94 is attached to the bottom of a plurality of supports 96 extending from the upper fan housing 86 and serves to direct the flow of air from fan 92 towards the sides of the fan housing 84.

Upon activation of the motor 70, rotor 72 and drive shaft 84 are caused to rotate and consequently fan blade 92 rotates thereby creating a vacuum which draws air through inlets 28, into circular opening 30, through filter element 56 in the area of the openings 64, through the lower foam piece 46, through opening 92 and into the lower fan housing 88. Rotation of the fan blade 92 forces air up and around the outer edge of the diverter 94, into upper housing portion 86 between supports 96, into the lower end of the motor 70, up through the annular gap between the armature 72 and field winding 74, up around and-through the upper end of the motor 70, through upper foam piece 50, and into the upper chamber of the casing 12. Lastly, the air travels through the plurality of small openings 42 and out through the large circular opening 44 into an elongate hose or pipe for supplying the pressurized, warm air to a whirlpool, spa, bath massage tube or mat, and the like, or vented to the room.

As the air enters inlets 28 in the base of the casing 12, it does so at approximately room temperature. As the air travels through the blower 10 it is heated by conducting heat from the motor and fan unit 14 and other internal components of the blower 10 which are heated due to operation of the motor 70. As the air exits the outlet 44 it does so at approximately 10° to 20° F. higher than room temperature. Thus, the blower 10 serves as a low-noise warm-air blower which supplies pressurized, warm air to a whirlpool, spa, bubble massager or the like without the necessity of an additional heating element within the blower or external thereto.

In the exemplary embodiment shown in FIGS. 1 and 2 of the drawings, it is preferred that the flow of air through and around the motor 70 be controlled by adding an upstanding pipe or tube 98 to the upper fan housing 86 concentric with the motor 70 to facilitate and direct the flow of air through and around the motor in a generally upward direction. The inner surface of the tube 98 is lined with a layer of foam 100 and any openings between the field winding 74 and the upper fan housing 86 are sealed with a layer of pliable sealant 104 such as silicone gel. This arrangement forces the air drawn by fan blade 92 to pass between the field windings 74 and armature 72 and confines the air to the vicinity adjacent the upper end of motor 70 as the air passes through the blower. Not only does this arrangement increase the effective heating of the air as it flows through the device, but also serves to dampen and reduce the noise generated by the motor 70. The tube 98 has cutouts or notches 106, 108 and 110 to accommodate the lower portion of the outlet structure 36 and the motor brush supports.

It is to be understood that only the upper and lower foam pieces 50 and 46 of the foam layer 16 need to be sufficiently porous to allow for the flow of air through the blower 10. The other foam pieces 48, 52 and 100 need not be formed of foam material which is sufficiently porous to allow for the flow of air therethrough. The foam pieces 46 and 50 are joined to their respective side pieces 48 and 52 by any suitable glue, cement or solvent, for example, silicone sealant, or may be formed as an integral member.

Figure 5:
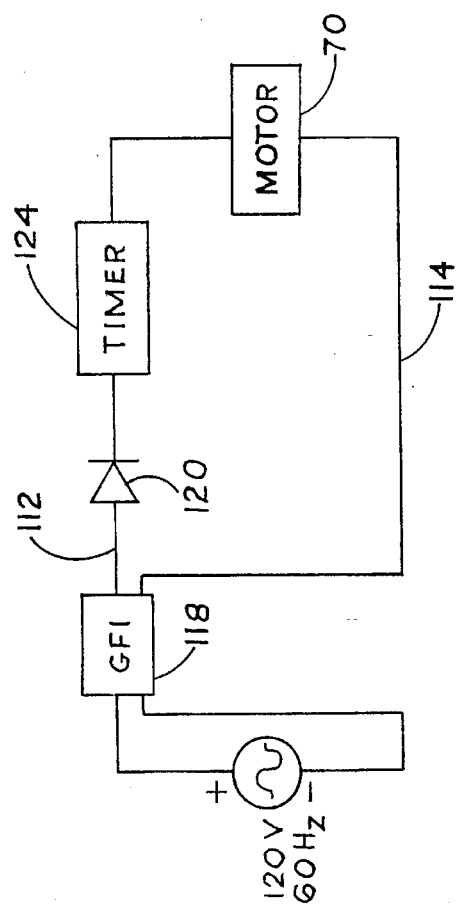

With reference to FIGS. 1, 2 and 5 of the drawings, the blower 10 includes an electrical drive circuit having power and ground leads 112 and 114 forming part of an elongate power cord 116 extending through an opening in the sidewall 24 of lower casing section 20. A plug end of the power cord 116 includes a conventional ground fault circuit interrupt (GFCI or ALCI) or breaker 118 which will interrupt the drive current to the motor 70 should there be a short in the blower 10. The power lead 112 is connected to a diode 120 which is in turn connected to one terminal 122 of a conventional timer 124. The other terminal 126 of the timer 124 is connected to the motor 70. The timer 124 includes a shaft 128 which passes through top 34 of upper casing section 18. A knob or handle 130 is attached to the upper end of timer shaft 128. The timer 124 serves as both an on/off switch, that is the knob 130 can be turned to the off position, and to provide for a selected time interval for operation of the blower 19 and associated whirlpool, spa, bubble massager and the like. The diode 120 is a conventional solid state diode rectifier and serves as a half wave rectifier to reduce the voltage to the motor 79. The diode 120 causes the motor to operate at a slower and yet adequate speed so as to reduce the noise and increase the heating of the air passing through the blower 10. For example, by using a 120 volt, one horsepower (hp) electric motor 70, which is more than adequate to supply sufficient air for the purposes of a bathtub type bubble massage apparatus such as described in Pat. No. Des 335,350 issued on May 4, 1993 and entitled "HOSE FOR AIR-WATER MASSAGER", the one horsepower motor can be operated at approximately half of its regular voltage. If a 240 volt, one horsepower motor is used, the diode 120 can be eliminated if using a 110 or 120 volt AC supply.

In accordance with one example of the drive circuit for the present invention, the blower drive circuit includes a ten foot long power cord (18 AWG, 2/C, TYPE SJT, 105° C.) with a conventional GFCI or ALCI equipped plug end having test and reset IN4141G1) and a conventional 0–60 minute rotary timer (1HP 125 VAC, MARKTIME by M. H. Rhodes, Inc., Avon, Conn. 06001).

It is contemplated that the drive circuit can be modified to include a panic button or kill switch, a replaceable fuse, and/or a speed or voltage controller should these items be required, for example, to meet with local, state or federal guidelines. There is sufficient space in the upper casing section 18 adjacent the timer 124 to accommodate these items.

In order to keep the noise produced by the operation of the blower 10 at a minimum, it is preferred that the cylindrical casing 12 be made of a plastic solid, such as about one-fourth inch thick, six and three-fourth inch outer diameter, polyvinyl chloride (PVC) casing and that the tube 98, housing portions 86 and 88, fan blade 92, supports 96, and disc 94 also be formed of plastic materials, such as PVC, rather than metal.

In accordance with one example of the present invention, the foam layer 16 is made up of at least about one-fourth to three-fourths of an inch thick, preferably three-eighths inch thick, medium or high density, resilient porous foam rubber, sponge rubber, or foam plastic material. The foam density is preferably less than ten pounds per cubic foot and, more particularly, less than five pounds per cubic foot. The foam has a preferred firmness of less than 50 pounds for an Indentation-Load-Deflection (ILD) of 25%. ILD is a term used for furniture upholstery cushions and carpet pads and corresponds to force on a 50 square inch circular disk to cause the noted percentage of deflection in compression.

In accordance with one example of the present invention, a low-noise warm-air blower having an eloquently simple and compact construction has overall outer dimensions of less than about ten inches high, and less than about seven inches in diameter, includes a resilient foam encapsulation layer of about three-eighths inch thick porous medium density foam rubber, a one stage thru-flow vacuum motor including an AC 240 volt, 60/50 hertz one phase ball/sleeve bearing open thru-flow universal electric motor and centrifugal fan having an approximately five and three-fourths inch diameter fan housing and a two inch orifice, marketed by AMETEK, Lamb Electric Division, Racine, Wis. WI, 53403, Model No. 116882-50, and a drive circuit having a rotary 0–60 minutes timer and a GFCI, and operates quietly, safely and effectively to provide a sufficient amount of pressurized warm air for driving a whirlpool, warm-air spa, air-water massager and the like.

In accordance with another example of the present invention, the low-noise air blower having an eloquently simple and compact construction of the previous example has been modified to include a one stage thru-flow vacuum motor having a centrifugal fan and a 120 volt, 60/50 hertz, one phase, ball/sleeve bearing, open, thru-flow universal electric motor and a diode rectifier in the drive circuit.

In accordance with another example, a replaceable 3M brand multi-layer air filter media having permanently electrostatically charged fibers with up to a 99.9% efficiency rate on dust and allergens as small as 0.3 micrometers while allowing a high volume of air to be regenerated is added as an air intake filter element to the blower of each of the previous examples to produce an air filtration system which operates safely, effectively and quietly and which can filter the volume of air in an average household room up to three times in an hour.

In accordance with another example of the present invention, the air filtration system of the above example is utilized as an air filtration and deodorization system in that a fragrance such as a scented oil is added to the filter element so that the air is simultaneously filtered and scented.

The feet or legs 60, the GFCI or ALCI plug 118, and the small outlet openings 42 located in the upper half, preferably the upper third, of the outlet structure 36 as well as other features contribute to the operational safety of the low-noise air blower 10. For example, in order for water to enter the interior of casing 12 of the blower 10, a quantity of water sufficient to fill over half of the cavity in the outlet structure 36 must be present to reach the lowest opening 42. Typically, only a small amount of water would find its way back to the blower 10 from a whirlpool, spa, air-water massager or the like, which is itself equipped with a safety valve or check valve for preventing the flow of water back to the blower or other source of pressurized air. Should the electric motor 70 short circuit due to water entering the casing 12, excessive wear to one or more of the motor parts, or malfunction of one or more of the motor parts, the GFCI or ALCI breaker will open and thereby deactivate the blower motor 70 and break the flow of current to the blower 10 eliminating the possibility of shock or electrocution. An additional safety feature is the use of plastic materials such as polyvinyl chloride which serve as electrical insulators.

Attributes of the present invention which contribute to the low-noise aspect of the air blower 10 include but are not limited to the use of plastic and resin materials, the inclusion of the encapsulation foam layer, no rigid connection between the motor and fan unit and outer casing, legs of resilient material, a circuitous air flow path, low speed operation of the motor and fan unit, and small size outlet openings 42, as well as other features of the present invention.

Characteristics of the present invention which contribute to the effective heating of the air flowing through the blower 10 to provide a source of warm air without the necessity of adding additional heating elements include but are not limited to operating the motor and fan unit at slow speeds and under load, forcing the air to travel through the electric motor between the rotor and stator and up and around the upper end of the motor, small size outlet openings 42, and the foam encapsulation layer which serves not only to attenuate sound and vibration but also to insulate and thereby concentrate the heat of the motor in the area of the air flow path as well as other characteristics of the invention.

Operation of the low-noise warm air blower 10, as a source of pressured air for a whirlpool, spa, air-water bubble massager and the like, is very simple. A user or operator having dry hands plugs the end 118 of the power cord 116 into a conventional household outlet, depresses the test button on the ALCI to check that it is operating, and then presses the reset button to close the breaker and thereby provide drive current to the blower 10. Next, the user connects and inserts an elongate hose, pipe or adapter into the cylindrical orifice 44 of the outlet structure 36 and rotates timer knob 130 to the desired position so as to provide for activation of the blower 10 for the selected time duration. When the time runs out and the timer 124 causes deactivation of the motor and fan unit 14, the user dries off, removes the hose from the orifice 44 and removes the plug of the power cord 116 from the wall outlet. During use of the low-noise warm-air blower 10, the user or operator should be sure that their hands and feet are dry and that the elongate flexible hose and outlet structure 36 do not contain water.

After many uses of the low-noise warm-air blower 10, the user or operator can look at the filter element 56 through the transparent cover plate 58 and if it appears to be dirty, the user or operator can remove the cover plate 58 and either replace the filter element 56 or merely rotate the element through a small angle, for example, a 20° angle, to position a clean portion of the filter element over each of the openings 64 in the support disc 62.

After years of use of the low-noise warm-air blower, the blower may be reconditioned by removing the retaining element 22, separating the upper and lower casing sections, pulling the leads from the timer 124, replacing the foam encapsulation layer replacing the pliable air seals 54 and 104 and replacing or reconditioning the motor and fan unit 14. Next, the blower is reassembled by reconnecting the timer leads, placing the upper casing section 18 in superimposed position with the lower casing section 20 and attaching the retaining element 22.

The elegantly simple and compact construction of the low-noise warm-air blower 10 provides for a relatively inexpensive assembly process including, for example, molding the upper and lower casing sections 18 and 20, inserting the perforated support disc 62 into the base of the lower section 20, joining the foam segments 46 and 48 together and placing them into the lower casing section 20, inserting the flow-thru motor and fan unit 14 into the lower casing with the fan housing 84 nested into the lower portion of the foam encapsulation. Then, attaching the tube 98 to the upper surface of the fan housing 86, placing a layer of silicone gel between the casing 12 and tube 98 and between the motor 70 and tube 98, inserting the motor leads through the upper portion of the foam encapsulation layer (50 and 52), placing the upper foam encapsulation layer in position over the motor and fan unit, attaching the timer 124 to the upper casing section 18, attaching the motor leads to the timer and ground lead, attaching the diode to the timer and positive lead, placing the upper casing section over the lower casing section, and attaching the retaining element 22. Next, a filter element 56 is placed in the recess 66 in support disc 62, a retaining ring 68 is inserted to hold the filter element in position, resilient feet 60 are glued to cover plate 58, and the cover plate is attached to the lower surface of the base 26 of lower casing section 20.

Thus, it will be appreciated that as a result of the present invention, a highly effective improved low-noise air blower is provided by which the principal objective, among others, is completely fulfilled. It is contemplated and will be apparent to those skilled in the art from the preceding description and accompanying drawings that modifications and/or changes may be made in the illustrative embodiments without departure from the present invention. Accordingly, it is expressly intended that the foregoing description and accompanying drawings are illustrative of preferred embodiments only, not limiting, and that the true spirit and scope of the present invention should be determined by reference to the appended claims.

What is claimed is:

1. A low-noise air blower for use as a source of pressurized air for hydro-therapy systems, air filtration systems or other appliances comprising:

an outer casing having a lower section with at least one air inlet and an upper section with at least one air outlet, a flow-thru motor and fan unit located inside of said casing and adapted to pull air in through said air inlet and force air out through said air outlet, and a layer of noise and vibration dampening resilient foam located between said flow-thru motor and fan unit and said casing, said layer of foam separating said motor and fan unit from said casing, supporting and suspending said motor and fan unit, and including upper and lower cup-like foam elements each having respective air permeable porous areas to allow for the passage of air from said air inlet of said casing to said flow-thru motor and fan unit and from said flow-thru motor and fan unit to said air outlet in said casing, whereby said flow-thru motor and fan unit is encapsulated and suspended within said casing by said layer of foam without any rigid connection between said casing and said flow-thru motor and fan unit.

2. The low-noise air blower as recited in claim 1 wherein said casing is formed of polyvinyl chloride.

3. The low-noise air blower as recited in claim 1 wherein said upper and lower foam elements each include a circular foam piece and a cylindrical sidewall joined thereto.

4. The low-noise air blower as recited in claim 1 wherein said flow-thru motor and fan unit comprises an electric motor having an armature mounted on a drive shaft supported for rotation relative to a fixed field winding with an air gap between said armature and said field winding, a fan blade attached to said drive shaft for rotation therewith, and air directing means for directing the flow of air through said air gap in said motor.

5. A low-noise air blower for use as a source of pressurized air for hydro-therapy systems, air filtration systems or other appliances comprising:

an outer casing having at least one air inlet and at least one air outlet, wherein said air inlet of said casing comprises a plurality of radial openings which lead to a central circular opening in said casing, a flow-through motor and fan unit located inside of said casing and adapted to pull air in through said air inlet and force air out through said air outlet, and a layer of noise and vibration dampening resilient foam located between said flow-through motor and fan unit and said casing, said layer of foam having respective air permeable porous areas to allow for the passage of air from said air inlet of said casing to said flow-through motor and fan unit and from said flow-through motor and fan unit to said air outlet in said casing, whereby said flow-through motor and fan unit is encapsulated and suspended within said casing by said layer of foam without any rigid connection between said casing and said flow-through motor and fan unit.

6. The low-noise air blower as recited in claim 5 further comprising a perforated support disc covering said central opening in said casing.

7. The low-noise air blower as recited in claim 6 further comprising a replaceable air filter element in said central opening and a removable cover plate attached to the exterior of said casing covering said air filter element and said opening.

8. The low-noise air blower as recited in claim 7 wherein said removable cover plate defines one surface of said plurality of radial openings in said casing.

9. The low-noise air blower as recited in claim 8 wherein said removable cover plate is transparent and held in position by threaded fasteners.

10. The low-noise air blower as recited in claim 7 further comprising a removable retaining ring for releasably securing said replaceable air filter element In said central opening against said support disc.

11. The low-noise air blower as recited in claim 10 wherein said flow-thru motor and fan unit comprises an electric motor having an armature mounted on a drive shaft supported for rotation relative to a fixed field winding with an air gap between said armature and said field winding, a fan blade attached to said drive shaft for rotation therewith, and air directing means for directing the flow of air through said air gap in said motor.

12. The low-noise air blower as recited in claim 11 wherein said air directing means comprises a cylindrical fan housing having a circular air intake passage in one end and means for supporting said electric motor in the other end with said fan blade rotating in said fan housing, and a substantially cylindrical tube extending from said fan housing and surrounding said electric motor.

13. The low-noise air blower as recited in claim 12 wherein said casing, fan blade, filter element retaining ring, fan housing and tube surrounding said motor are formed of plastic.

14. The low-noise air blower as recited in claim 12 wherein said air directing means further comprises a resilient air seal separating the interior of said casing into upper and lower chambers divided in the area of said fan housing.

15. The low-noise air blower as recited in claim 7 further comprising a plurality of resilient feet extending from the lower surface of said cover plate for supporting said blower on a planar surface with said radial inlet openings spaced from said planar surface.

16. The low-noise air blower as recited in claim 15 having a compact construction and overall outer dimensions of said casing of less than twelve inches in height and less than ten inches in diameter.

17. A low-noise air blower for use as a source of pressurized air for hydro-therapy systems, air filtration systems or other appliances comprising:

an outer casing having at least one air inlet and at least one air outlet, a flow-through motor and fan unit located inside of said casing and adapted to pull air in through said air inlet and force air out through said air outlet, said flow-through motor and fan unit comprising an electric motor having an armature mounted on a drive shaft supported for rotation relative to a fixed field winding with an air gap between said armature and said field winding, a fan blade attached to said drive shaft for rotation therewith, and air directing means for directing the flow of air through said air gap in said motor, wherein said air directing means comprises a cylindrical fan housing having a circular air intake passage in one end and means for supporting said electric motor in the other end with said fan blade rotating in said fan housing, and a substantially cylindrical tube extending from said fan housing and surrounding said electric motor, a layer of noise and vibration dampening resilient foam located between said flow-through motor and fan unit and said casing, said layer of foam having respective air permeable porous areas to allow for the passage of air from said air inlet of said casing to said flow-through motor and fan unit and from said flow-through motor and fan unit to said air outlet in said casing, whereby said flow-through motor and fan unit is encapsulated and suspended within said casing by said layer of foam without any rigid connection between said casing and said flow-through motor and fan unit.

18. The low-noise air blower as recited in claim 17 wherein said substantially cylindrical tube surrounding said motor is lined with a layer of resilient foam.

19. The low-noise air blower as recited in claim 17 wherein said air directing means further comprises a resilient air seal separating the interior of said casing into upper and lower chambers divided in the area of said fan housing.

20. The low-noise air blower as recited in claim 19 wherein said air seal is made of silicone sealant.

21. A low-noise air blower for use as a source of pressurized air for hydro-therapy systems, air filtration systems or other appliances comprising:

an outer casing having at least one air inlet and at least one air outlet, wherein said casing includes a substantially cylindrical sidewall and said air outlet in said casing comprises a cylindrical pipe segment extending radially through said sidewall and having one end closed with the exception of at least one small opening in the upper half thereof to allow for the flow of air from an upper chamber of said casing while preventing water from entering said casing and having the other end open to accommodate the insertion of an elongate hose of a bubble massager or the like, a flow-through motor and fan unit located inside of said casing and adapted to pull air in through said air inlet and force air out through said air outlet, and a layer of noise and vibration dampening resilient foam located between said flow-through motor and fan unit and said casing, said layer of foam having respective air permeable porous areas to allow for the passage of air from said air inlet of said casing to said flow-through motor and fan unit and from said flow-through motor and fan unit to said air outlet in said casing, whereby said flow-through motor and fan unit is encapsulated and suspended within said casing by said layer of foam without any rigid connection between said casing and said flow-through motor and fan unit.

22. The low-noise air blower as recited in claim 21 wherein said closed end of said pipe segment includes a plurality of small openings in the upper one-third thereof.

23. A low-noise air blower for use as a source of pressurized air for hydro-therapy systems, air filtration systems or other appliances comprising:

an outer casing having at least one air inlet and at least one air outlet, a flow-through motor and fan unit located inside of said casing and adapted to pull air in through said air inlet and force air out through said air outlet, said flow-thru motor and fan unit comprises an electric motor having an armature mounted on a drive shaft supported for rotation relative to a fixed field winding with an air gap between said armature and said field winding, a fan blade attached to said drive shaft for rotation therewith, and air directing means for directing the flow of air through said air gap in said motor, an electric motor drive circuit including a half wave rectifier to reduce the voltage to said electric motor, and a layer of noise and vibration dampening resilient foam located between said casing, said layer of foam having respective air permeable porous areas to allow for the passage of air from said air inlet of said casing to said flow-through motor and fan unit and from said flow-through motor and fan unit to said air outlet in said casing, whereby said flow-through motor and fan unit is encapsulated and suspended within said casing by said layer of foam without any rigid connection between said casing and said flow-through motor and fan unit.

24. The low-noise air blower as recited in claim 23 wherein said half wave rectifier comprises a diode rectifier.

25. The low-noise air blower as recited in claim 23 wherein said drive circuit further includes a ground fault circuit interrupter to break the drive current to said electric motor in the event of a short in said circuit or motor.

26. The low-noise air blower as recited in claim 25 wherein said drive circuit further includes a timer switch.

27. The low-noise air blower as recited in claim 17 wherein said blower includes an elongate power cord and said ground fault circuit interrupter includes test and reset buttons and is located in a plug end of said power cord.

28. In an air blower for use with a whirlpool bath, spa, bubble massager and the like including an outer housing having at least one air inlet and one air outlet and an inner motor and fan unit, the improvement comprising:

said air outlet comprising a horizontally oriented cylindrical pipe segment extending through said housing, a back wall at one end of said segment, a circular opening at the other end of said segment, and an air restriction comprising a plurality of circular openings of less than one-half inch in diameter in the upper one-half of the side wall of said segment.

* * * * *